(12) United States Patent
Wang

(10) Patent No.: US 10,452,186 B2
(45) Date of Patent: Oct. 22, 2019

(54) HANDWRITING DISPLAY DEVICE, AND MANUFACTURING METHOD AND CONTROLLING METHOD FOR THE SAME

(71) Applicants: BOE Technology Group Co., Ltd., Beijing (CN); Beijing BOE Display Technology Co., Ltd., Beijing (CN)

(72) Inventor: Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 167 days.

(21) Appl. No.: 15/677,211

(22) Filed: Aug. 15, 2017

(65) Prior Publication Data

US 2018/0136772 A1 May 17, 2018

(30) Foreign Application Priority Data

Nov. 11, 2016 (CN) .......................... 2016 1 1041077

(51) Int. Cl.
*G06F 3/044* (2006.01)
*G06F 3/041* (2006.01)
(Continued)

(52) U.S. Cl.
CPC ............ *G06F 3/0414* (2013.01); *G06F 3/044* (2013.01); *G06F 3/0412* (2013.01); *G09F 9/372* (2013.01);
(Continued)

(58) Field of Classification Search
CPC ......... G06F 2203/04103; G06F 3/0412; G06F 3/0414; G06F 3/044; G09F 9/372; G09G 2300/0426; G09G 2354/00; G09G 3/344
See application file for complete search history.

(56) References Cited

U.S. PATENT DOCUMENTS 7,342,556 B2 * 3/2008 Oue ....................... G02F 1/167
345/106
10,234,987 B2 3/2019 Moon et al.
(Continued)

FOREIGN PATENT DOCUMENTS

CN 102081272 A 6/2011
CN 102141854 A 8/2011
(Continued)

OTHER PUBLICATIONS

First Office Action, including Search Report, for Chinese Patent Application No. 201611041077.9, dated Dec. 27, 2018, 13 pages.

*Primary Examiner* — Ram A Mistry
(74) *Attorney, Agent, or Firm* — Westman, Champlin & Koehler, P.A.

(57) ABSTRACT

The present disclosure provides a handwriting display device and a manufacturing method for the same. In one embodiment, the handwriting display device includes a plurality of unit pixels arranged in array, and each of the unit pixels comprises a display unit and a piezoelectric unit configured for sensing a pressure to excite the display unit and the display unit is configured for displaying a picture under excitation implemented by the piezoelectric unit. The present disclosure also provides a controlling method for the handwriting display device.

20 Claims, 5 Drawing Sheets

(51) Int. Cl.
*G09G 3/34* (2006.01)
*G09F 9/37* (2006.01)

(52) U.S. Cl.
CPC ... *G09G 3/344* (2013.01); *G06F 2203/04103* (2013.01); *G09G 2300/0426* (2013.01); *G09G 2354/00* (2013.01)

(56) References Cited

U.S. PATENT DOCUMENTS

| | | | |
|---|---|---|---|
| 2004/0263483 A1* | 12/2004 | Aufderheide | G06F 3/03545 345/173 |
| 2006/0209039 A1* | 9/2006 | Destura | G06F 3/0412 345/173 |
| 2008/0100566 A1* | 5/2008 | Miyasaka | G09G 3/3446 345/107 |
| 2010/0309136 A1* | 12/2010 | Liu | G06F 3/0231 345/169 |
| 2011/0181533 A1 | 7/2011 | Pan et al. | |
| 2013/0155490 A1 | 6/2013 | Zhang | |

FOREIGN PATENT DOCUMENTS

| | | |
|---|---|---|
| CN | 102654805 A | 9/2012 |
| CN | 103529616 A | 1/2014 |
| CN | 105302398 A | 2/2016 |

\* cited by examiner

HANDWRITING DISPLAY DEVICE, AND MANUFACTURING METHOD AND CONTROLLING METHOD FOR THE SAME

CROSS-REFERENCE TO RELATED APPLICATION

This application claims priority to Chinese Patent Application No. 201611041077.9 filed on Nov. 11, 2016 in the State Intellectual Property Office of China, the present disclosures of which are hereby incorporated by reference in their entirety.

TECHNICAL FIELD

The present disclosure relates to the technical field of handwriting display, and particularly, to a handwriting display device, and a manufacturing method and a controlling method for the same.

BACKGROUND

Applications of a handwriting display device with handwriting display function are more and more wide-ranging at present. Conventional handwriting display device usually includes a handwriting region and a display region independent from each other. When in use, a user firstly inputs content in the handwriting region, a recognition unit of the handwriting display device recognizes the content inputted in the handwriting region into standard text, and then, the standard text is displayed in the display region. When using this handwriting display device, the user's eyes needs to be constantly switched between the handwriting region and the display region, to view the displayed result while viewing the content of the input. In this way, use efficiency of the conventional handwriting display device is relatively low.

SUMMARY

In a first aspect of the present disclosure, there is provided a handwriting display device, comprising a plurality of unit pixels arranged in array, wherein, each of the unit pixels comprises a display unit and a piezoelectric unit configured for sensing a pressure to excite the display unit and the display unit is configured for displaying a picture under excitation implemented by the piezoelectric unit;

the piezoelectric unit comprises a first plate electrode, a second common plate electrode parallel with and opposite to the first plate electrode, and a piezoelectric medium between the first plate electrode and the second common plate electrode;

the display unit comprises a third plate electrode, a fourth plate electrode parallel with and opposite to the third plate electrode, and a display medium between the third plate electrode and the fourth plate electrode; and whereby, in the piezoelectric unit, an excitation voltage difference is generated between the first plate electrode and the second common plate electrode when a pressure is sensed by the piezoelectric medium; and in the display unit, a display voltage difference is generated between the third plate electrode and the fourth plate electrode under excitation of the excitation voltage difference, and the display medium moves under the action of the display voltage difference, thereby the display unit displays the picture.

In a second aspect of the present disclosure, there is provided a manufacturing method for the above handwriting display device, and the manufacturing method comprises:

forming a plurality of unit pixels arranged in array, each of the unit pixels comprising: the piezoelectric unit configured for sensing a pressure to excite the display unit and the display unit configured for displaying a picture under excitation implemented by the piezoelectric unit.

In a third aspect of the present disclosure, there is provided a controlling method for the above handwriting display device, and the controlling method comprises:

sensing a pressure by the piezoelectric unit in each of the unit pixels of the handwriting display device, and displaying a picture by the display unit in each of the unit pixels.

DETAILED DESCRIPTION OF THE EMBODIMENTS

In order to provide a further explanation of a handwriting display device, a manufacturing method and a controlling method for the same according to these embodiments of the present disclosure, these embodiments of the present disclosure will be described hereinafter in detail and completely with reference to the attached drawings.

Figure 1:
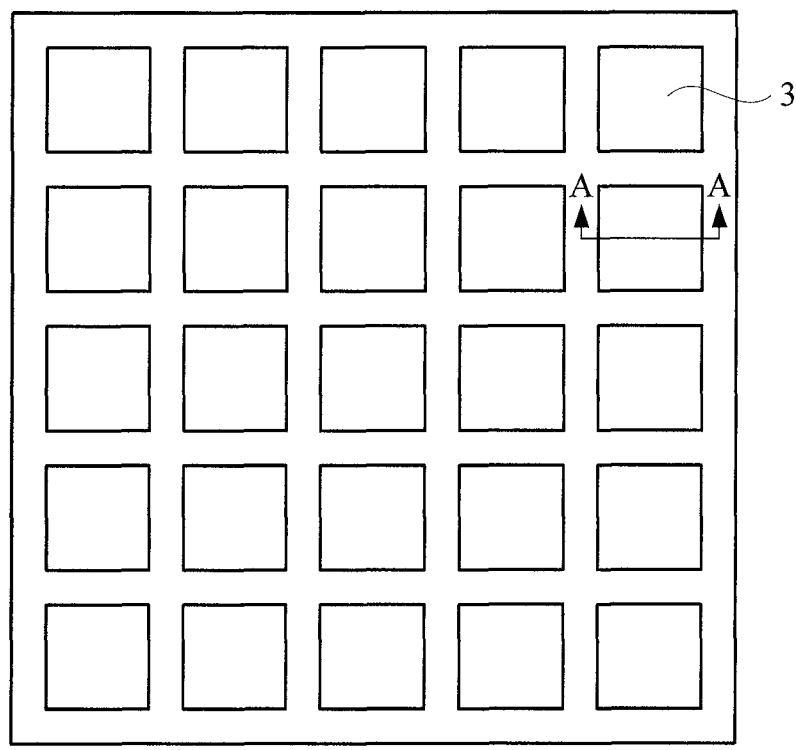
FIG. 1 is a top view of a handwriting display device according to embodiments of the present disclosure.
Figure 2:
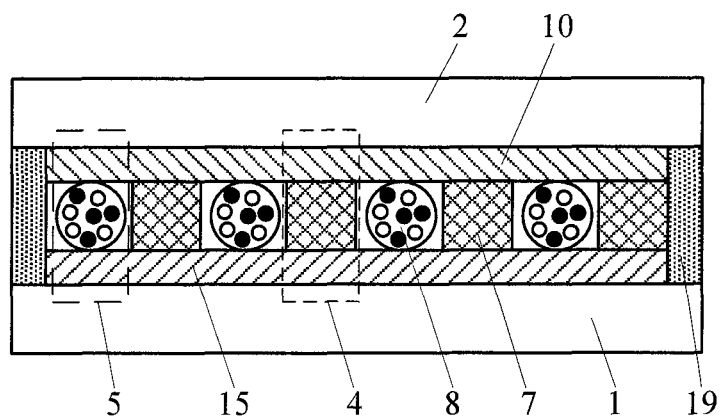
FIG. 2 is a view along an A-A line in FIG. 1 according to a first embodiment of the present disclosure.

Referring to FIG. 1 and FIG. 2, according to embodiments of the present disclosure, a handwriting display device comprises a plurality of unit pixels 3 arranged in array, each of the unit pixels 3 comprises a piezoelectric unit 4 and a display unit 5, the piezoelectric unit 4 is configured for sensing a pressure to excite a display unit 5, and the display unit 5 is configured for displaying a picture under excitation implemented by the piezoelectric unit 4.

In the embodiments of the present disclosure, the handwriting display device comprises the plurality of unit pixels 3 arranged in array, and each of the unit pixels 3 comprises the piezoelectric unit 4 and the display unit 5. When the handwriting display device according to embodiments of the present disclosure is used, a handwriting input can be implemented directly on the handwriting display device. The piezoelectric unit 4 senses a pressure generated during the handwriting input, that is, the piezoelectric unit 4 receives the pressure. Then, the piezoelectric unit 4 excites the display unit 5, and the display unit 5 displays a picture under excitation implemented by the piezoelectric unit 4, to achieve the picture displaying of the handwriting display device.

Accordingly, compared with conventional handwriting display device including the handwriting region and the display region independent from each other, the handwriting region and the display region are integrated together in the handwriting display device according to embodiments of the present disclosure. Accordingly, the problem that the user's eyes need to be constantly switched between the handwriting region and the display region when using the conventional handwriting display device is solved, and thus use efficiency of the handwriting display device can be improved.

What's more, when using the handwriting display device according to embodiments of the present disclosure, once a user implements a handwriting input directly on the handwriting display device, the handwriting display device can just display a content inputted by the user. Compared with the fact that a recognition unit is required in the conventional handwriting display device to recognize the content inputted in the handwriting region into standard text, provision of the recognition unit is omitted in the handwriting display device according to embodiments of the present disclosure. As a result, structure of the handwriting display device according to embodiments of the present disclosure can be simplified and manufacturing cost of the handwriting display device can be reduced.

In addition, when using the handwriting display device according to embodiments of the present disclosure, once the piezoelectric unit 4 in the unit pixel 3 senses a pressure generated during the handwriting input implemented by a user, the display unit 5 displays a picture. As a result, the handwriting display device according to embodiments of the present disclosure can achieve handwriting input and picture displaying without being equipped with an electrical source.

In these embodiments of the present disclosure, in each of the unit pixels 3, quantity of the piezoelectric unit 4 and quantity of the display unit 5 may be set according to practical requirements. For example, both quantity of the piezoelectric unit 4 and quantity of the display unit 5 may be one, or else, both quantity of the piezoelectric unit 4 and quantity of the display unit 5 may be multiple.

The handwriting display device according to embodiments of the present disclosure may have a variety of uses. For example, it can be used as a label, or it can be used as a hand-writable advertisement display device, or it also can be used as a white board or a black board applied in teachings, and the like.

In these embodiments of the present disclosure, the piezoelectric unit 5 may comprise a first plate electrode, a second plate electrode parallel with and opposite to the first plate electrode, and a piezoelectric medium 7 between the first plate electrode and the second plate electrode. The display unit 5 comprises a third plate electrode, a fourth plate electrode parallel with and opposite to the third plate electrode, and a display medium 8 between the third plate electrode and the fourth plate electrode. Whereby, in the piezoelectric unit 4, an excitation voltage difference is generated between the first plate electrode and the second plate electrode when a pressure is sensed by the piezoelectric medium 7; and in the display unit 5, a display voltage difference is generated between the third plate electrode and the fourth plate electrode under excitation of the excitation voltage difference, and the display medium 8 moves under the action of the display voltage difference, thereby the display unit 5 displays a picture.

For example, the piezoelectric unit 4 comprises the piezoelectric medium 7 manufactured from piezoelectric material, and the display unit 5 comprises the display medium 8, for example, including positive display particles and negative display particles having different colors. When using the handwriting display device according to embodiments of the present disclosure, once a handwriting input is implemented directly on the handwriting display device, in the piezoelectric unit 4, the piezoelectric medium 7 senses a pressure, and generates an excitation voltage difference between the first plate electrode and the second plate electrode of the piezoelectric unit 4, that is, the excitation voltage difference is generated in the piezoelectric unit 4. In the display unit 5, a display voltage difference is generated between the third plate electrode and the fourth plate electrode under excitation of the excitation voltage difference, that is, the display voltage difference is generated in the display unit 5. Positive display particles of the display medium 8 move to the positive plate electrode (third plate electrode or fourth plate electrode) in the display unit 5, while negative display particles of the display medium 8 move to the negative plate electrode (fourth plate electrode or third plate electrode) in the display unit 5, so that, the unit pixel 3 presents in the color of the negative display particles or in the color of the positive display particles, thereby achieving a picture displaying of the handwriting display device.

In these embodiments of the present disclosure, there may have various arrangements of the piezoelectric unit 4 and the display unit 5. Examples of several arrangements of the piezoelectric unit 4 and the display unit 5 are exemplarily presented hereafter, however, the present disclosure is not limited to these examples.

Figure 3:
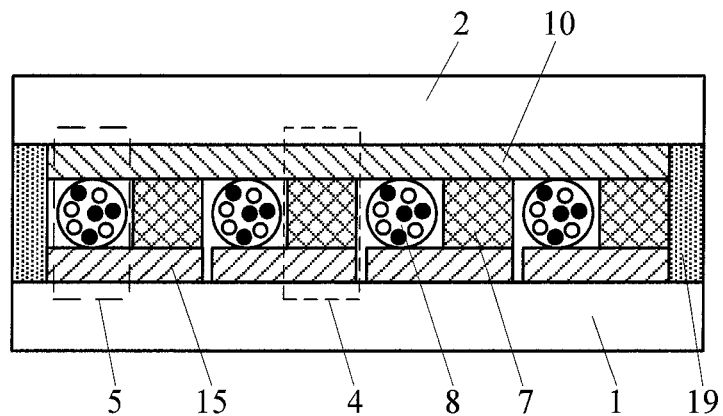
FIG. 3 is a view along an A-A line in FIG. 1 according to a second embodiment of the present disclosure.

In a first example, referring to FIG. 1, FIG. 2 and FIG. 3, according to an embodiment of the present disclosure, a handwriting display device comprises a first substrate 1 and a second substrate 2 parallel with and opposite to each other, and the unit pixels 3 are between the first substrate 1 and the second substrate 2. Each of the unit pixels 3 comprises a first common electrode 10 and a first sub-pixel electrode 15 which are parallel with the first substrate 1, the first common electrode 10 is on the second substrate 2, the first sub-pixel electrode 15 is on the first substrate 1, and the first sub-pixel electrode 15 is opposite to the first common electrode 10. Both the first plate electrode of the piezoelectric unit 4 and the third plate electrode of the display unit 5 are formed of the first sub-pixel electrode 15, while both the second plate electrode of the piezoelectric unit 4 and the fourth plate electrode of the display unit 5 are formed of the first common electrode 10. Specifically, the fact that both the first plate electrode of the piezoelectric unit 4 and the third plate electrode of the display unit 5 are formed of the first sub-pixel electrode 15 while both the second plate electrode of the piezoelectric unit 4 and the fourth plate electrode of the display unit 5 are formed of the first common electrode 10 indicates that the piezoelectric unit 4 and the display unit 5 are actually a same capacitor in which both the piezoelectric medium 7 and the display medium 8 are provided. When using the handwriting display device according to the embodiment of the present disclosure, once a handwriting input is implemented directly on the handwriting display device, piezoelectric medium 7 of the piezoelectric unit 4 senses a pressure, the piezoelectric unit 4 generates an excitation voltage difference, while the display unit 5 has a corresponding display voltage difference, and the display medium 8 moves under the action of the display voltage difference, so that the unit pixel 3 displays a picture, thereby achieving a picture displaying of the handwriting display device.

In practical applications, quantity of the first common electrode 10 and quantity of the first sub-pixel electrode 15 may be set according to practical requirements. For example, in the embodiment of FIG. 2, quantity of the first common electrode 10 may be one, and quantity of the first sub-pixel electrode 15 may also be one, in this case, the piezoelectric medium 7 and the display medium 8 are provided between the first common electrode 10 and the first sub-pixel electrode 15, and, the first common electrode 10 and the first sub-pixel electrode 15 together form one capacitor. That is, the capacitor is not only for the piezoelectric unit 4 but also for the display unit 5, in other words, this unit pixel 3 comprises one piezoelectric unit 4 and one display unit 5.

Alternatively, in the embodiment of FIG. 3, quantity of the first common electrode 10 may be one, and quantity of the first sub-pixel electrode 15 may be multiple. A piezoelectric medium 7 and a display medium 8 are provided between the first common electrode 10 and each of the first sub-pixel electrodes 15. Here, the first common electrode 10 and each of the first sub-pixel electrodes 15 together form one capacitor, which is not only for the piezoelectric unit 4 but also for the display unit 5. In other words, this unit pixel 3 comprises a plurality of piezoelectric units 4 and a plurality of display units 5. With such design, as shown in FIG. 3, when using the handwriting display device according to the embodiment of the present disclosure, once a handwriting input is implemented directly on the handwriting display device, the piezoelectric mediums 7 in the piezoelectric units 4 of the unit pixel 3 sense pressures. As the unit pixel 3 comprises a plurality of piezoelectric units 4, different pressures are sensed by the piezoelectric mediums 7 in the piezoelectric units 4 located at different regions of the unit pixel 3 when the pressures applied in different regions of the unit pixel 3 are different. At this moment, the excitation voltage differences generated by the piezoelectric units 4 located at different regions of the unit pixel 3 are different, and thus the display voltage differences generated in corresponding display units 5 are different, so that degrees of movements of the display mediums 8 in different display units 5 are different. In a display unit 5 where a relatively greater display voltage difference is generated, degree of movement of the display medium 8 is relatively greater correspondingly. For example, in case that the display medium 8 comprises positive display particles and negative display particles, degree of movements of the positive display particles and the negative display particles away from each other is relatively greater, even that the positive display particles and the negative display particles of the display medium 8 are completely moved away from each other, that is, all the positive display particles are moved to the first common electrode 10 or the first sub-pixel electrode 15, and all the negative display particles are moved to the first sub-pixel electrode 15 or the first common electrode 10. Darker color and greater grey scale are presented in a region of the unit pixel 3 corresponding to the display unit 5 where the relatively greater display voltage difference is generated. Degree of movement of the display medium 8 in the display unit 5 where the relatively smaller display voltage difference is generated is relatively smaller. For example, in case that the display medium 8 comprises positive display particles and negative display particles, degree of movements of the positive display particles and the negative display particles away from each other is relatively smaller. Lighter color and smaller grey scale are presented in a region of the unit pixel 3 corresponding to the display unit 5 where the relatively smaller display voltage difference is generated. As a result, quality of picture displaying of the handwriting display device can be improved.

It should be noted that, in case that the unit pixel 3 comprises a plurality of piezoelectric units 4 and a plurality of display units 5, quantity of the first common electrode 10 may be one and quantity of the first sub-pixel electrode 15 may be multiple; or, quantity of the first common electrode 10 may be multiple and quantity of the first sub-pixel electrode 15 may be one; or else, quantity of the first common electrode 10 may be multiple and quantity of the first sub-pixel electrode 15 may be multiple, here, a piezoelectric medium 7 and a display medium 8 are provided between each first common electrode 10 and each corresponding first sub-pixel electrode 15, and each first common electrode 10 and each corresponding first sub-pixel electrode 15 together form one capacitor. That is, the capacitor is not only for the piezoelectric unit 4 but also for the display unit 5.

In case that quantity of the first common electrode 10 is multiple, a spacing between every two adjacent first common electrodes 10 should be less than size of the display medium 8. For example, if the display medium 8 is in a spherical shape, then the spacing between every two adjacent first common electrodes 10 should be less than a diameter of the display medium 8. Correspondingly, in case that quantity of the first sub-pixel electrode 15 is multiple, a spacing between every two adjacent first sub-pixel electrodes 15 should be less than size of the display medium 8. For example, if the display medium 8 is in a spherical shape, then the spacing between every two adjacent first sub-pixel electrodes 15 should be less than a diameter of the display medium 8.

In case that quantity of the first sub-pixel electrode 15 is one, the first sub-pixel electrode 15 completely covers the corresponding unit pixel 3. In case that quantity of the first sub-pixel electrode 15 is multiple, shapes of the first sub-pixel electrodes 15 may be various. For example, the first sub-pixel electrodes 15 may have stripped shapes, and the plurality of strip-shaped first sub-pixel electrodes 15 are arranged in parallel; or else, the first sub-pixel electrodes 15 may have block shapes, and the plurality of block-shaped first sub-pixel electrodes 15 are arranged in array. Likewise, in case that quantity of the first common electrode 10 is one, the first common electrode 10 completely covers the corresponding unit pixel 3. In case that quantity of the first common electrode 10 is multiple, shapes of the first common electrodes 10 may be various. For example, the first common electrodes 10 may have stripped shapes, and the plurality of strip-shaped first common electrodes 10 are arranged in parallel; or else, the first common electrodes 10 may have block shapes, and the plurality of block-shaped first common electrodes 10 are arranged in array.

When the handwriting display device according to the embodiment of the present disclosure is used to display a picture, a user needs to clear away a currently displayed picture presented on the handwriting display device, in order to allow the handwriting display device to be ready to implement another handwriting input and thus to enable the handwriting display device to display a content provided by implementing the another handwriting input. Many methods may be used to clear away the currently displayed picture presented on the handwriting display device. For example, the handwriting display device according to the embodiments of the present disclosure may further comprise a refreshing circuit 30 connected to the first common electrode 10 and the first sub-pixel electrode 15, respectively, and the refreshing circuit 30 is configured to apply a reverse voltage difference, that is opposite to the display voltage difference, between the first common electrode 10 and the first sub-pixel electrode 15, to discharge the display unit 5. In other words, if it needs to clear away the currently displayed picture presented on the handwriting display device, then the refreshing circuit 30 applies a reverse voltage difference between the first common electrode 10 and the first sub-pixel electrode 15. Direction of the reverse voltage difference is opposite to that of the display voltage difference. That is, the refreshing circuit 30 applies a reverse voltage difference that is opposite to the display voltage difference to the display unit 5. At this moment, the display unit 5 begins to discharge, the display medium 8 in the display unit 5 resets into its original state, the unit pixel 3 does not display a picture, and thus the handwriting display device does not display the currently displayed picture. Accordingly, clearing away of the currently displayed picture presented on the handwriting display device is done, so that the handwriting display device is refreshed.

Clearing away of the currently displayed picture presented on the handwriting display device may also be done in the following manner. The handwriting display device according to embodiments of the present disclosure further comprises a first short circuit 40 connected to the first common electrode 10 and the first sub-pixel electrode 15, respectively, and the first short circuit 40 is configured to make a direct short between the first common electrode 10 and the first sub-pixel electrode 15. If it needs to clear away a currently displayed picture presented on the handwriting display device, then the first short circuit 40 causes a direct short between the first common electrode 10 and the first sub-pixel electrode 15, so that electric potential of the first common electrode 10 and electric potential of the first sub-pixel electrode 15 gradually tend to be the same, the display medium 8 in the display unit 5 gradually resets into its original state, the unit pixel 3 does not display a picture, and thus the handwriting display device does not display the currently displayed picture. Accordingly, clearing away of the currently displayed picture presented on the handwriting display device is done, so that the handwriting display device is refreshed.

Figure 3A:
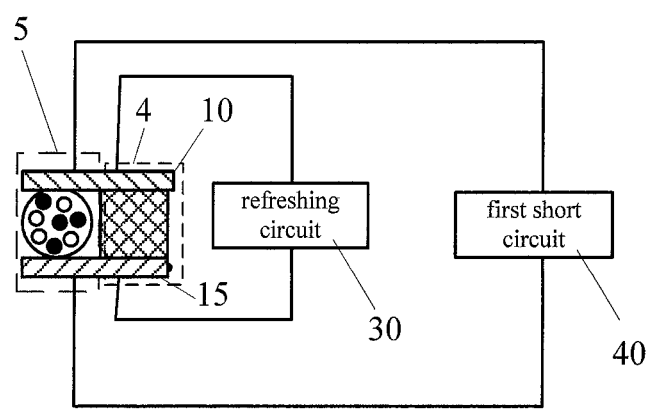
FIG. 3a is an equivalent circuit diagram corresponding to FIG. 3.

In practical applications, clearing away of the currently displayed picture presented on the handwriting display device may also be done in the following manner. Referring to FIG. 1, FIG. 3 and FIG. 3*a*, the handwriting display device according to embodiments of the present disclosure further comprises a refreshing circuit 30 and a first short circuit 40. The refreshing circuit 30 is connected to the first common electrode 10 and the first sub-pixel electrode 15, respectively, and the refreshing circuit 30 is configured to apply a reverse voltage difference, that is opposite to the display voltage difference, between the first common electrode 10 and the first sub-pixel electrode 15, to discharge the display unit 5. The first short circuit 40 is connected to the first common electrode 10 and the first sub-pixel electrode 15, respectively, and the first short circuit 40 is configured to make a direct short between the first common electrode 10 and the first sub-pixel electrode 15. If it needs to clear away a currently displayed picture presented on the handwriting display device, firstly, the refreshing circuit 30 applies a reverse voltage difference between the first common electrode 10 and the first sub-pixel electrode 15. Direction of the reverse voltage difference is opposite to that of the display voltage difference. That is, the refreshing circuit 30 applies a reverse voltage difference that is opposite to the display voltage difference to the display unit 5. At this moment, the display unit 5 begins to discharge. When a current voltage difference of the display unit 5 is reduced to a certain value, for example, it is reduced to be a half of the display voltage difference, the first short circuit 40 causes a direct short between the first common electrode 10 and the first sub-pixel electrode 15, so that electric potential of the first common electrode 10 and electric potential of the first sub-pixel electrode 15 gradually tend to be the same, the display medium 8 in the display unit 5 gradually resets into its original state, the unit pixel 3 does not display a picture, and thus the handwriting display device does not display the currently displayed picture. Accordingly, clearing away of the currently displayed picture presented on the handwriting display device is done, so that the handwriting display device is refreshed. With such design, compared with the abovementioned two manners of clearing away of the currently displayed picture presented on the handwriting display device, it can speed up clearing away of the currently displayed picture presented on the handwriting display device, that is, it can speed up refreshing of the handwriting display device.

In the above first example, both the piezoelectric unit 4 and the display unit 5 share the first common electrode 10 and the first sub-pixel electrode 15, that is, the piezoelectric unit 4 and the display unit 5 actually form a same capacitor. In practical applications, the piezoelectric unit 4 and the display unit 5 may also not actually form a same capacitor.

Figure 4:
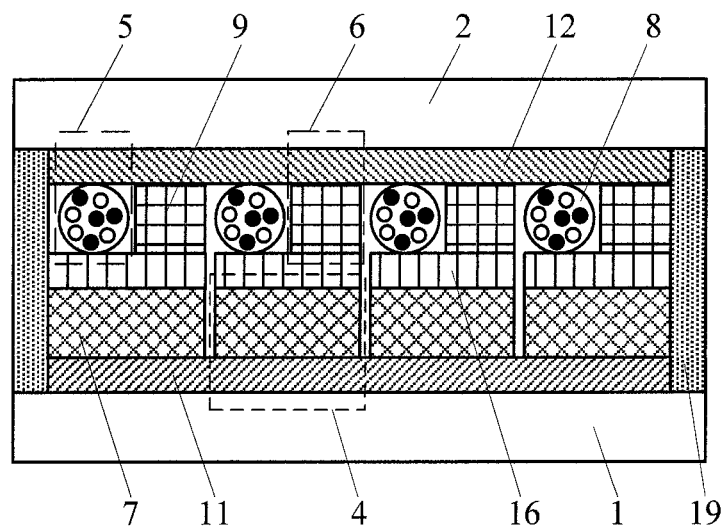
FIG. 4 is a view along an A-A line in FIG. 1 according to a third embodiment of the present disclosure.

In a second example, referring to FIG. 1 and FIG. 4, according to an embodiment of the present disclosure, a handwriting display device comprises a first substrate 1 and a second substrate 2 parallel with and opposite to each other, and the unit pixels 3 are between the first substrate 1 and the second substrate 2. Each of the unit pixels 3 comprises a second common electrode 11, a third common electrode 12 and a second sub-pixel electrode 16 which are parallel with the first substrate 1, the second common electrode 11 is on the first substrate 1, the third common electrode 12 is on the second substrate 2, the second common electrode 11 is opposite to the third common electrode 12, and the second sub-pixel electrode 16 is between the second common electrode 11 and the third common electrode 12. The first plate electrode of the piezoelectric unit 4 is formed of the second common electrode 11, the fourth plate electrode of the display unit 5 is formed of the third common electrode 12, and both the second plate electrode of the piezoelectric unit 4 and the third plate electrode of the display unit 5 are formed of the second sub-pixel electrode 16.

Specifically, according to the embodiment of the present disclosure, the handwriting display device comprises a first substrate 1 and a second substrate 2, and a plurality of unit pixels 3 arranged in array between the first substrate 1 and the second substrate 2. Each of the unit pixels 3 comprises a second common electrode 11, a third common electrode 12 and a second sub-pixel electrode 16 arranged in parallel, the second common electrode 11 is on the first substrate 1, the third common electrode 12 is on the second substrate 2, and the second sub-pixel electrode 16 is between the second common electrode 11 and the third common electrode 12. The second common electrode 11 and the second sub-pixel electrode 16 together form the piezoelectric unit 4, and the third common electrode 12 and the second sub-pixel electrode 16 together form the display unit 5. Here, the piezoelectric unit 4 and the display unit 5 share the second sub-pixel electrode 16, and the piezoelectric unit 4 and the display unit 5 actually not form a same capacitor.

When using the handwriting display device according to the embodiment of the present disclosure, once a handwriting input is implemented directly on the handwriting display device, the piezoelectric medium 7 senses a pressure, the piezoelectric unit 4 generates an excitation voltage difference, and a voltage difference is generated between the second common electrode 11 and the second sub-pixel electrode 16, and thus a voltage difference is also generated between the second sub-pixel electrode 16 and the third common electrode 12. That is, in the display unit 5, a display voltage difference is generated under excitation of the excitation voltage difference. Under the action of the display voltage difference, the display medium 8 moves, so that the unit pixel 3 displays a picture, thereby achieving a picture displaying of the handwriting display device.

Figure 5:
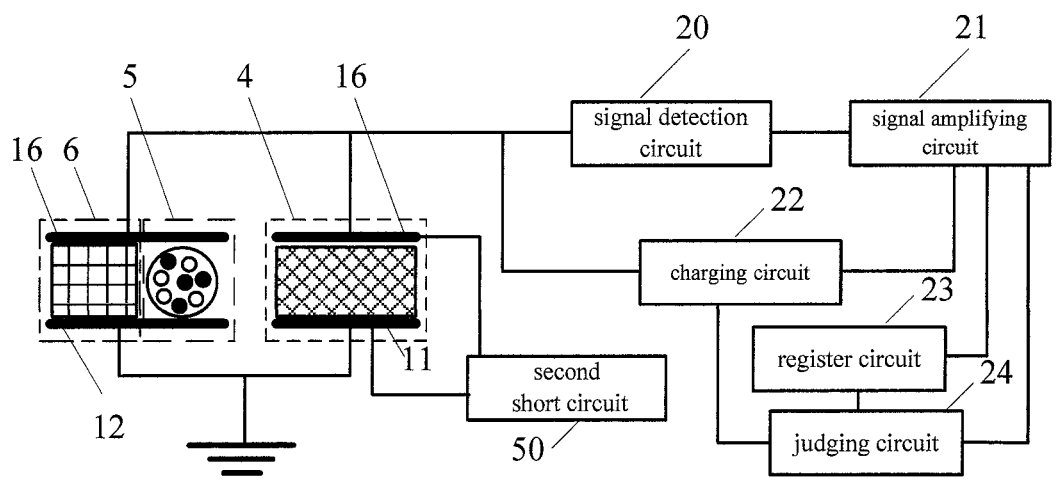
FIG. 5 is an equivalent circuit diagram corresponding to FIG. 4.

Based on the above description, the piezoelectric unit 4 and the display unit 5 may be regarded as two capacitors in parallel connection, and the piezoelectric unit 4 and the display unit 5 share the second sub-pixel electrode 16. When using the handwriting display device according to the embodiment of the present disclosure, electric potential of one of the plate electrodes in the piezoelectric unit 4 and electric potential of one of the plate electrodes in the display unit 5 are the same, namely, the same electric potential is electric potential of the second sub-pixel electrode 16 shared by the piezoelectric unit 4 and the display unit 5. However, electric potential of the other of the plate electrodes in the piezoelectric unit 4 and electric potential of the other of the plate electrodes in the display unit 5 may be the same, or may be different; namely, electric potential of the second common electrode 11 and electric potential of the third common electrode 12 may be the same, or may be different. In this embodiment of the present disclosure, electric potential of the second common electrode 11 and electric potential of the third common electrode 12 are the same, for example, both the second common electrode 11 and the third common electrode 12 are grounded. At this moment, an equivalent circuit diagram of the piezoelectric unit 4 and the display unit 5 is shown in FIG. 5. The piezoelectric unit 4 and the display unit 5 are in parallel connection, and both the second common electrode 11 and the third common electrode 12 are grounded. When the handwriting display device displays a picture, current voltage difference of the piezoelectric unit 4 and current voltage difference of the display unit 5 are the same.

In the above second example, quantity of the piezoelectric unit 4 and quantity of the display unit 5 may be set according to practical requirements. For example, both quantity of the piezoelectric unit 4 and quantity of the display unit 5 may be one. Or else, both quantity of the piezoelectric unit 4 and quantity of the display unit 5 may be multiple, and there is an one-to-one match between the plurality of piezoelectric units 4 and the plurality of display units 5, in this case, quantity of the second common electrode 11 and quantity of the third common electrode 12 may be multiple respectively. Or else, quantity of the second sub-pixel electrode 16 may also be multiple. There is no limitation on this herein.

Referring to FIG. 4 and FIG. 5, according to the embodiment of the present disclosure, each of the unit pixels 3 further comprises a retaining unit 6, and the retaining unit 6 comprises a fifth plate electrode, a sixth plate electrode opposite to the fifth plate electrode, and a dielectric medium 9 between the fifth plate electrode and the sixth plate electrode. The fifth plate electrode of the retaining unit 6 is formed of the second sub-pixel electrode 16, and the sixth plate electrode of the retaining unit 6 is formed of the third common electrode 12. The retaining unit 6 is configured to keep a current voltage difference of the display unit 5 after the pressure sensed by the piezoelectric medium 7 is cancelled.

Specifically, the fifth plate electrode of the retaining unit 6 is formed of the second sub-pixel electrode 16, and the sixth plate electrode of the retaining unit 6 is formed of the third common electrode 12. That is to say, both the retaining unit 6 and the display unit 5 share the second sub-pixel electrode 16 and the third common electrode 12. When using the handwriting display device according to the embodiment of the present disclosure, once a handwriting input is implemented directly on the handwriting display device, the piezoelectric medium 7 senses a pressure, and the piezoelectric unit 4 generates an excitation voltage difference; meanwhile, the display unit 5 generates a display voltage difference, and the retaining unit 6 generates a retaining voltage difference which is actually the display voltage difference generated by the display unit 5. As a dielectric medium 9 made of a material having a high dielectric constant is provided in the retaining unit 6, when the pressure sensed by the piezoelectric medium 7 is cancelled, the dielectric medium 9 can slow down a discharging speed of the retaining unit 6, that is, can slow down discharging speed of the display unit 5. As a result, the display unit 5 can be controlled in a better manner, and effect and quality of picture displaying of the handwriting display device are improved, in addition, anti-interference capability of the unit pixel 3 can be enhanced.

It should be noted that, in case that the display unit 5 and the retaining unit 6 share the second sub-pixel electrode 16 and the third common electrode 12, a display medium 8 and a dielectric medium 9 are between the second sub-pixel electrode 16 and the third common electrode 12. In case that the display medium 8 adopts an electrophoretic monomer while the dielectric medium 9 adopts transparent complex compound or colloid having a high dielectric constant, the capacitor units may be mixed into the complex compound or colloid. With such design, no display medium 8 and no dielectric medium 9 should be provided between the second sub-pixel electrode 16 and the third common electrode 12, which simplifies manufacturing process of the handwriting display device.

Referring to FIG. 5, the handwriting display device according to the embodiment of the present disclosure further comprises a signal detection circuit 20, a signal amplifying circuit 21 and a charging circuit 22 connected in sequence. The signal detection circuit 20 is also connected to the display unit 5, and the charging circuit 22 is also connected to the retaining unit 6. The signal detection circuit 20 is configured for detecting the display voltage difference generated by the display unit 5 when the pressure is sensed by the piezoelectric medium 7. The signal amplifying circuit 21 is configured for amplifying the display voltage difference detected by the signal detection circuit 20. The charging circuit 22 is configured for charging the retaining unit 6 in accordance with the display voltage difference amplified by the signal amplifying circuit 21.

When using the handwriting display device according to the embodiment of the present disclosure, once a handwriting input is implemented directly on the handwriting display device, the piezoelectric medium 7 senses a pressure, the piezoelectric unit 4 generates an excitation voltage difference, the display unit 5 generates a display voltage difference under excitation of the excitation voltage difference, and the display medium 8 moves under the action of the display voltage difference, so that the unit pixel 3 displays a picture, thereby achieving a picture displaying of the handwriting display device. At this moment, the signal detection circuit 20 detects the display voltage difference generated by the display unit 5 and transmits it to the signal amplifying circuit 21. The signal amplifying circuit 21 amplifies the display voltage difference generated by the display unit 5 and detected by the signal detection circuit 20, in accordance with a preset magnification times; or, looks up a table database in which relationship between the display voltage difference and the magnification times are pre-stored in accordance with the display voltage difference generated by the display unit 5 and detected by the signal detection circuit 20, obtains the magnification times for the display voltage difference generated by the display unit 5 and detected by the signal detection circuit 20, and amplifies the display voltage difference generated by the display unit 5 and detected by the signal detection circuit 20. Then, the signal amplifying circuit 21 transmits the amplified display voltage difference to the charging circuit 22. The charging circuit 22 charges the retaining unit 6, so that retaining voltage difference of the retaining unit 6 matches the display voltage difference amplified by the signal amplifying circuit 21. Here, current voltage difference of the display unit 5 matches the display voltage difference amplified by the signal amplifying circuit 21, and degree of movements of the positive display particles and the negative display particles of display mediums 8 away from each other 5 is increased, as a result, color presented by the unit pixel 3 is darkened, grey scale of the handwriting display device is enhanced, quality of picture displaying of the handwriting display device is improved, and, anti-interference capability of the unit pixel 3 is also enhanced.

The charging circuit 22 charges the retaining unit 6 in accordance with the display voltage difference amplified by the signal amplifying circuit 21. Charging of the retaining unit 6 may be continued in the course that the piezoelectric medium 7 senses pressure. When the pressure sensed by the piezoelectric medium 7 is cancelled, the charging circuit 22 stops charging the retaining unit 6 in accordance with the display voltage difference amplified by the signal amplifying circuit 21. Of course, when the pressure sensed by the piezoelectric medium 7 is cancelled, the charging circuit 22 may also keep charging the retaining unit 6 in accordance with the display voltage difference amplified by the signal amplifying circuit 21, till a refreshing instruction is received by the handwriting display device.

The handwriting display device according to the embodiment of the present disclosure further comprises a register circuit 23 and a judging circuit 24. The register circuit 23 is connected to the signal amplifying circuit 21 and is configured for storing the display voltage difference amplified by the signal amplifying circuit 21; the signal detection circuit 20 is also configured for detecting the current voltage difference of the display unit 5 after the pressure sensed by the piezoelectric medium 7 is cancelled; the judging circuit 24 is connected to the signal detection circuit 20, the register circuit 23 and the charging circuit 22, respectively, and is configured for judging whether or not the current voltage difference of the display unit 5 is less than the display voltage difference amplified by the signal amplifying circuit 21; and the charging circuit 22 is also configured for charging the retaining unit 6 when it is judged by the judging circuit that the current voltage difference of the display unit 5 is less than the display voltage difference amplified by the signal amplifying circuit 21.

After the display voltage difference detected by the signal detection circuit 20 is amplified by the signal amplifying circuit 21, the register circuit 23 stores the display voltage difference amplified by the signal amplifying circuit 21. After the pressure sensed by the piezoelectric medium 7 is cancelled, the signal detection circuit 20 detects current voltage difference of the display unit 5 and transmits the current voltage difference to the judging circuit 24. The judging circuit 24 judges whether or not the current voltage difference of the display unit 5 is less than the display voltage difference amplified by the signal amplifying circuit 21. When it is judged by the judging circuit 24 that the current voltage difference of the display unit 5 is less than the display voltage difference amplified by the signal amplifying circuit 21, the charging circuit 22 charges the retaining unit 6, so that, the retaining voltage difference of the retaining unit 6 matches the display voltage difference amplified by the signal amplifying circuit 21, and the current voltage difference of the display unit 5 matches the display voltage difference amplified by the signal amplifying circuit 21. As a result, the color presented by the unit pixel 3 is kept, display stability of the unit pixel 3 is enhanced, and grey scale of the handwriting display device is held, so that quality of picture displaying of the handwriting display device is improved.

Clearing away of the currently displayed picture presented on the handwriting display device can be done in the following manner. The handwriting display device further comprises a second short circuit 50 connected to the second common electrode 11 and the second sub-pixel electrode 16, respectively, and the second short circuit 50 is configured to make a direct short between the second common electrode 11 and the second sub-pixel electrode 16. Specifically, if it needs to clear away a currently displayed picture presented on the handwriting display device, the second short circuit 50 makes a direct short between the second common electrode 11 and the second sub-pixel electrode 16, so that electric potential of the second common electrode 11 and electric potential of the second sub-pixel electrode 16 gradually tend to be the same, the piezoelectric unit 4 and the display unit 5 discharge simultaneously, the display medium 8 resets into its original state, and the unit pixel 3 does not display the currently displayed picture. Accordingly, Clearing away of the currently displayed picture presented on the handwriting display device is done, so that the handwriting display device is refreshed.

In the above second example, the piezoelectric unit 4 and the display unit 5 are actually not a same capacitor, but one plate electrode of the piezoelectric unit 4 and one plate electrode of the display unit 5 share the second sub-pixel electrode 16. In practical application, a manner that the piezoelectric unit 4 and the display unit 5 are actually not a same capacitor but the piezoelectric unit 4 and the display unit 5 are completely separated from each other may be adopted.

Figure 6:
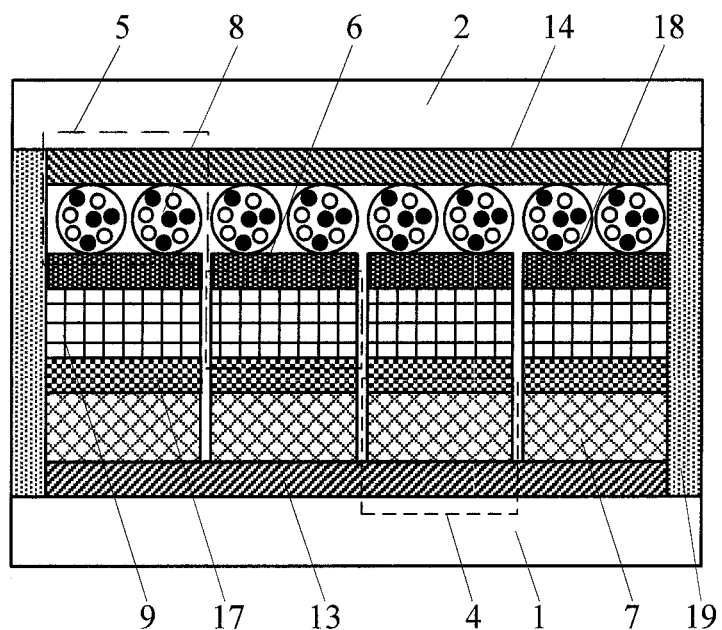
FIG. 6 is a view along an A-A line in FIG. 1 according to a fourth embodiment of the present disclosure.
Figure 7:
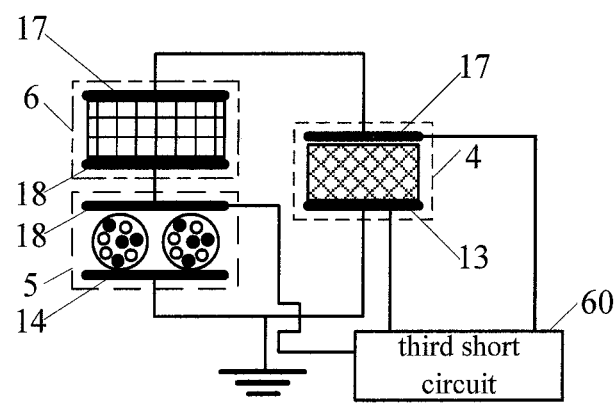
FIG. 7 is an equivalent circuit diagram corresponding to FIG. 6.

In a third example, referring to FIG. 1, FIG. 6 and FIG. 7, according to an embodiment of the present disclosure, a handwriting display device comprises a first substrate 1 and a second substrate 2 parallel with and opposite to each other, and the unit pixels 3 are between the first substrate 1 and the second substrate 2. Each of the unit pixels 3 comprises a fourth common electrode 13, a fifth common electrode 14, a third sub-pixel electrode 17 and a fourth sub-pixel electrode 18 parallel with the first substrate 1, the fourth common electrode 13 is on the first substrate 1, the fifth common electrode 14 is on the second substrate 2, the fourth common electrode 13 is opposite to the fifth common electrode 14, the third sub-pixel electrode 17 is between the fourth common electrode 13 and the fifth common electrode 14, and the fourth sub-pixel electrode 18 is between the third sub-pixel electrode and the fifth common electrode 14. The first plate electrode of the piezoelectric unit 4 is formed of the fourth common electrode 13, the second plate electrode of the piezoelectric unit 4 is formed of the third sub-pixel electrode 17, the third plate electrode of the display unit 5 is formed of the fourth sub-pixel electrode 18, and the fourth plate electrode of the display unit 5 is formed of the fifth common electrode 14.

Specifically, according to the embodiment of the present disclosure, the handwriting display device comprises a first substrate 1 and a second substrate 2 opposite to each other, and a plurality of unit pixels 3 arranged in array between the first substrate 1 and the second substrate 2. Each of the unit pixels 3 comprises a fourth common electrode 13, a fifth common electrode 14, a third sub-pixel electrode 17 and a fourth sub-pixel electrode 18 arranged in parallel with one another. The fourth common electrode 13 is on the first substrate 1, the fifth common electrode 14 is on the second substrate 2, the fourth common electrode 13 is opposite to the fifth common electrode 14, the third sub-pixel electrode 17 is between the fourth common electrode 13 and the fifth common electrode 14, the fourth sub-pixel electrode 18 is between the third sub-pixel electrode 17 and the fifth common electrode 14, the fourth common electrode 13 and the third sub-pixel electrode 17 together form the piezoelectric unit 4, the fifth common electrode 14 and the fourth sub-pixel electrode 18 together form the display unit 5, and the piezoelectric unit 4 and the display unit 5 actually not form a same capacitor.

When using the handwriting display device according to the embodiment of the present disclosure, once a handwriting input is implemented directly on the handwriting display device, the piezoelectric medium 7 senses a pressure, the piezoelectric unit 4 generates an excitation voltage difference, and a voltage difference is also generated between the third sub-pixel electrode 17 and fourth sub-pixel electrode 18 under excitation of the excitation voltage difference, and thus the fourth sub-pixel electrode 18 and the fifth common electrode 14 are excited so that a voltage difference is generated between the fourth sub-pixel electrode 18 and the fifth common electrode 14. That is, in the display unit 5, a display voltage difference is generated under excitation of the excitation voltage difference. Under the action of the display voltage difference, the display medium 8 moves, so that the unit pixel 3 displays a corresponding color, thereby achieving a picture displaying of the handwriting display device.

In the above third example, quantity of the piezoelectric unit 4 and quantity of the display unit 5 may be set according to practical requirements. For example, both quantity of the piezoelectric unit 4 and quantity of the display unit 5 may be one. Or else, both quantity of the piezoelectric unit 4 and quantity of the display unit 5 may be multiple, and there is an one-to-one match between the plurality of piezoelectric units 4 and the plurality of display units 5, in this case, quantity of the third sub-pixel electrode 17 and quantity of the fourth sub-pixel electrode 18 may be multiple respectively. There is no limitation on this herein.

Referring to FIG. 6 and FIG. 7, according to the embodiment of the present disclosure, each of the unit pixels 3 further comprises a retaining unit 6, and the retaining unit 6 comprises a fifth plate electrode, a sixth plate electrode opposite to the fifth plate electrode, and a dielectric medium 9 between the fifth plate electrode and the sixth plate electrode. The fifth plate electrode of the retaining unit 6 is formed of the third sub-pixel electrode 17, and the sixth plate electrode of the retaining unit 6 is formed of the fourth sub-pixel electrode 18. The retaining unit 6 is configured to keep a current voltage difference of the display unit 5 after the pressure sensed by the piezoelectric medium 7 is cancelled.

Specifically, the fifth plate electrode of the retaining unit 6 is formed of the third sub-pixel electrode 17, and the sixth plate electrode of the retaining unit 6 is formed of the fourth sub-pixel electrode 18. That is to say, both one plate electrode of the retaining unit 6 and one plate electrode of the display unit 5 share the fourth sub-pixel electrode 18, and both the other plate electrode of the retaining unit 6 and one plate electrode of the piezoelectric unit 4 share the third sub-pixel electrode 17. When using the handwriting display device according to the embodiment of the present disclosure, once a handwriting input is implemented directly on the handwriting display device, the piezoelectric medium 7 senses a pressure, and the piezoelectric unit 4 generates an excitation voltage difference; meanwhile, the retaining unit 6 generates a retaining voltage difference, and the display unit 5 generates a display voltage difference. As a dielectric medium 9 made of a material having a high dielectric constant is provided in the retaining unit 6, when the pressure sensed by the piezoelectric medium 7 is cancelled, the dielectric medium 9 can slow down a discharging speed of the retaining unit 6, that is, can slow down discharging speed of the display unit 5. As a result, the display unit 5 can be controlled in a better manner, and effect and quality of picture displaying of the handwriting display device are improved.

In the above third example, the piezoelectric unit 4, the retaining unit 6 and the display unit 5 actually are not a same capacitor. Accordingly, compared with those in the first and second examples, distribution density of the display unit 5 is increased, distribution density of the display medium 8 in the display unit 5 is increased, contrast of the handwriting display device for picture displaying is enhanced, and effect and quality of picture displaying of the handwriting display device are improved.

Based on the above description, the piezoelectric unit 4, the retaining unit 6 and the display unit 5 may be regarded as being connected in series, and an equivalent circuit diagram of the piezoelectric unit 4, the retaining unit 6 and the display unit 5 is shown in FIG. 7. In practical operations, electric potential of the fourth common electrode 13 and electric potential of the fifth common electrode 14 are the same, for example, both the fourth common electrode 13 and the fifth common electrode 14 are grounded.

Clearing away of the currently displayed picture presented on the handwriting display device can be done in the following manner. The handwriting display device further comprises a third short circuit 60 connected to the fourth common electrode 13, the third sub-pixel electrode 17 and the fourth sub-pixel electrode 18, respectively, and the third short circuit 60 is configured to make direct shorts between third sub-pixel electrode 17 and the fourth common electrode 13 and between fourth sub-pixel electrode 18 and the fourth common electrode 13 simultaneously. Specifically, if it needs to clear away a currently displayed picture presented on the handwriting display device, the third short circuit 60 makes direct shorts between third sub-pixel electrode 17 and the fourth common electrode 13 and between fourth sub-pixel electrode 18 and the fourth common electrode 13 simultaneously, so that electric potential of the fourth common electrode 13, electric potential of the fifth common electrode 14, electric potential of the third sub-pixel electrode 17 and electric potential of the fourth sub-pixel electrode 18 gradually tend to be the same, the piezoelectric unit 4, the retaining unit 6 and the display unit 5 discharge simultaneously, the display medium 8 resets into its original state, and the unit pixel 3 does not display the currently displayed picture. Accordingly, Clearing away of the currently displayed picture presented on the handwriting display device is done, so that the handwriting display device is refreshed.

It should be noted that, in the above third example, signal detection circuit, signal amplifying circuit, charging circuit, register circuit and judging circuit may also be provided. Arrangements of the signal detection circuit, signal amplifying circuit, charging circuit, register circuit and judging circuit are similar to those in the second example, and thus are omitted herein for the sake of brevity.

Figure 8:
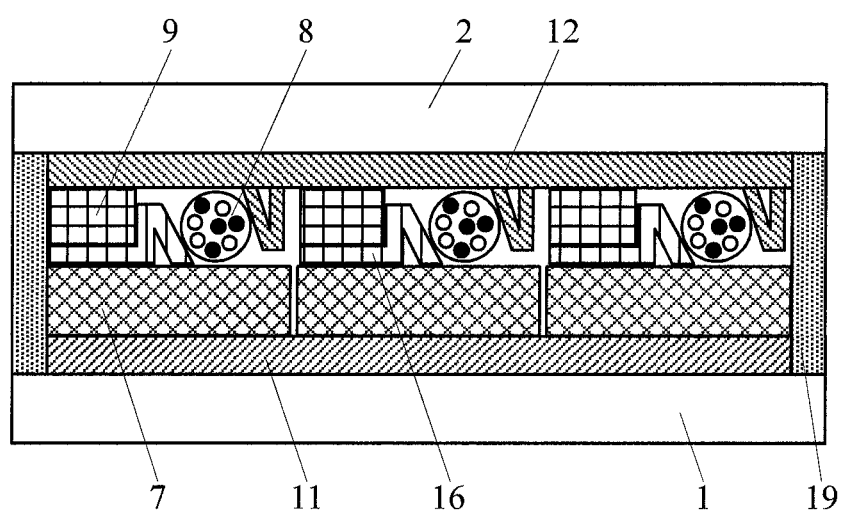
FIG. 8 is a view along an A-A line in FIG. 1 according to a fifth embodiment of the present disclosure.

In the first and second and third examples, both the third plate electrode and the fourth plate electrode of the display unit 5 are parallel with the first substrate 1. When using the handwriting display device according to these embodiments of the present disclosure, direction of electrical field of the display voltage difference generated by the display unit 5 is perpendicular to the first substrate 1. In practical applications, both the third plate electrode and the fourth plate electrode of the display unit 5 may also be parallel with each other but are not parallel with the first substrate 1. For example, in a modification of the above second example, both the third plate electrode and the fourth plate electrode of the display unit 5 are parallel with each other but are not parallel with the first substrate 1. Referring to FIG. 8, the unit pixels 3 comprises a second common electrode 11, a third common electrode 12 and a second sub-pixel electrode 16. The second common electrode 11 is on the first substrate 1, the second common electrode 11 is parallel with the first substrate 1, and the third common electrode 12 is on the second substrate 2. The third common electrode 12 comprises a common electrode parallel part being parallel with the first substrate 1 and a common electrode inclination part being not parallel with the first substrate 1. The second sub-pixel electrode 16 is between the second common electrode 11 and the third common electrode 12. The second sub-pixel electrode 16 comprises a sub-pixel electrode parallel part being parallel with the first substrate 1 and a sub-pixel electrode inclination part being not parallel with the first substrate 1. The common electrode inclination part and the sub-pixel electrode inclination part are opposite to and parallel with each other. The second common electrode 11 and the second sub-pixel electrode 16 together form the piezoelectric unit 4, and the common electrode inclination part and the sub-pixel electrode inclination part together form the display unit 5. The piezoelectric medium 7 is between the second common electrode 11 and the second sub-pixel electrode 16, and the display medium 8 is between the common electrode inclination part and the sub-pixel electrode inclination part. When using the handwriting display device according to these embodiments of the present disclosure, direction of electrical field of the display voltage difference generated by the display unit 5 is not perpendicular to the first substrate 1.

In these above embodiments, the first substrate 1 may be a rigid substrate. For example, the first substrate 1 may be a glass substrate which can suffer a pressure when writing contents on the handwriting display device. Of course, the first substrate 1 may also be a flexible substrate. The second substrate 2 may also be a rigid substrate. For example, the second substrate 2 may be a glass substrate. Or else, the second substrate 2 may also be a flexible substrate. For example, the second substrate 2 may comprise two layers of over coat (OC layers), of which a manufacturing process may adopt the following process. Firstly, a first over coat layer, which is served as a planarization layer and an electrode substrate, is formed on the rigid substrate. Then, an electrode (which may be the first common electrode 10 in the above first example, the third common electrode 12 in the above second example, or the fifth common electrode 14 in the above third example) is formed on the first over coat layer. After that, a second over coat layer, which is for protecting the electrode, is formed on the electrode. Finally, the first over coat layer is separated from the rigid substrate. Here, the first over coat layer may be made of a relatively softer material and have a relatively smaller thickness, and the second over coat layer may be made of a relatively harder material and have a relatively greater thickness, in order to enhance abrasive resistance of the second over coat layer.

Referring to FIG. 1 to FIG. 8, in the handwriting display device according to the embodiment of the present disclosure, a barrier 19 is provided at an edge of each of the unit pixels 3. Provision of the barrier 19, on one hand, can separate one of the unit pixels 3 from another, in order to avoid movement of the display medium 8 between first substrate 1 and second substrate 2. On the other hand, the barrier 19 may be made of a black material, in order to shield wirings connected between the electrodes and outside electrical circuits.

It should be noted that, in these above embodiments, the piezoelectric medium 7 adopts piezoelectric material which may be transparent or non-transparent. The display medium 8 may be made of an electrophoretic monomer material or a bistable state material, that is, the display medium 8 may be an electrophoretic monomer display medium, or a bistable state display medium.

In case that the display medium 8 is made of an electrophoretic monomer, the electrophoretic monomer comprises positive display particles and negative display particles. Color of the positive display particles is different from color of the negative display particles. Here, color of the positive display particles and color of the negative display particles may be set in accordance with practical requirements. For example, the positive display particles are in white color while the negative display particles are in black color. Under the action of the display voltage difference of the display unit 5, the positive display particles move to a display side of the handwriting display device and the negative display particles move to a side of the handwriting display device opposite to the display side. At this moment, a picture presented in the handwriting display device is in white color. Under the action of the display voltage difference of the display unit 5, the negative display particles move to the display side of the handwriting display device and the positive display particles move to the side of the handwriting display device opposite to the display side. At this moment, the picture presented in the handwriting display device is in black color. Of course, in practical applications, color of the positive display particles may be set to be black and color of the negative display particles may be set to be white. Or else, color of the positive display particles is set to be other color than the white and black and color of the negative display particles is set to be white, here, under the action of the display voltage difference of the display unit 5, the positive display particles move to a display side of the handwriting display device and the negative display particles move to a side of the handwriting display device opposite to the display side. At this moment, a picture presented in the handwriting display device is in multicolor. Alternatively, color of the positive display particles is set to be white and color of the negative display particles is set to be multicolor, here, under the action of the display voltage difference of the display unit 5, the negative display particles move to a display side of the handwriting display device and the positive display particles move to a side of the handwriting display device opposite to the display side. At this moment, a picture presented in the handwriting display device is in multicolor.

In case that the display medium 8 is made of a bistable state material, the handwriting display device can provide a multicolor displaying. The handwriting display device may be reflection type handwriting display device. Here, when the handwriting display device adopts the configuration in the above second example, metal may be chosen as material for the second common electrode 11. With light reflection performance of the metal, the handwriting display device is made to be a reflection type handwriting display device. When the handwriting display device adopts the configuration in the above third example, metal may be chosen as material for the fourth common electrode 13. With light reflection performance of the metal, the handwriting display device is made to be a reflection type handwriting display device. The handwriting display device may also be transmission type handwriting display device. Here, a backlight source may be provided at a side of the first substrate 1 away from the second substrate 2. The backlight source provides a backlight that outgoes through the second substrate 2, so that picture displaying of the handwriting display device is achieved. Furthermore, by adjustments of wavelength of the backlight provided by the backlight source and pitch of the bistable state material, various multicolor displayings of the handwriting display device can be achieved.

In case that the display medium 8 is made of a bistable state material and a retaining unit 6 is provided in the unit pixel 3, as the bistable state material has only two stable states, i.e. the bistable state material displays when a voltage difference applied on the bistable state material is greater than a threshold voltage of the bistable state material and does not display when the voltage difference applied on the bistable state material is less than the threshold voltage of the bistable state material, when current voltage difference of the display unit 5 is kept by the retaining unit 6, the signal amplifying circuit 21 only needs to amplify the display voltage difference detected by the signal detection circuit 20 and generated by the display unit 5 to be equal to or greater than the threshold voltage of the bistable state material, without looking up a table database, in order to determine magnitude of the amplification. In case that the display medium 8 is made of a bistable state material and no retaining unit 6 is provided in the unit pixel 3, if it needs to clear away a currently displayed picture presented on the handwriting display device, then a user only presses the handwriting display device to achieve full screen refreshing or partial refreshing of the handwriting display device, without requiring provision of the refreshing circuit and/or the short circuit.

It should be noted that, in the above embodiments, the common electrodes (the first common electrode 10, second common electrode 11, third common electrode 12, fourth common electrode 13 and fifth common electrode 14) may be made from Indium Tin Oxides (ITO) or metal, the sub-pixel electrodes (the first sub-pixel electrode 15, second sub-pixel electrode 16, third sub-pixel electrode 17 and fourth sub-pixel electrode 18) may be made from metal.

According to embodiments of the present disclosure, there also provides a manufacturing method for the handwriting display device according to the above embodiments of the present disclosure. The manufacturing method comprises:

forming a plurality of unit pixels arranged in array, each of the unit pixels comprising: the piezoelectric unit configured for sensing a pressure to excite the display unit and the display unit configured for displaying a picture under excitation implemented by the piezoelectric unit.

Same or like contents of one embodiment described in the description may refer to same or like contents of another embodiment described in the description, although each of them has its focus that is different from that of the other embodiments. Especially, the embodiments for the manufacturing method generally are same or similar to those for the device, and thus they are described shortly, however, same or like contents of the embodiments for the device may be referred to.

In case that the handwriting display device adopts a configuration described in the above first example, the step of forming the plurality of unit pixels arranged in array further comprises:

providing a first substrate and a second substrate;

forming a first sub-pixel electrode, a piezoelectric medium, a barrier and a display medium on the first substrate, wherein the piezoelectric medium and the display medium are on the first sub-pixel electrode while the barrier is at an edge of each of the unit pixels;

forming a first common electrode on the second substrate; and assembling the second substrate with the first substrate, so that the first sub-pixel electrode, the first common electrode and the piezoelectric medium together form the piezoelectric unit; while the first sub-pixel electrode, the first common electrode and the display medium together form the display unit.

Specifically, in the step of forming the first sub-pixel electrode, the piezoelectric medium, the barrier and the display medium on the first substrate, firstly, the first sub-pixel electrode is formed on the first substrate, then, an insulation layer is formed to cover over the first sub-pixel electrode in order to protect the first sub-pixel electrode, and finally, the piezoelectric medium, the barrier and the display medium are formed on the first sub-pixel electrode.

The step of forming the first sub-pixel electrode, the piezoelectric medium, the barrier and the display medium on the first substrate and the step of forming the first common electrode on the second substrate may be changed in order. For example, the step of forming the first sub-pixel electrode, the piezoelectric medium, the barrier and the display medium on the first substrate is implemented firstly, and then the step of forming the first common electrode on the second substrate is implemented. Or, the step of forming the first common electrode on the second substrate is implemented firstly, and then, the step of forming the first sub-pixel electrode, the piezoelectric medium, the barrier and the display medium on the first substrate is implemented. Or else, the step of forming the first sub-pixel electrode, the piezoelectric medium, the barrier and the display medium on the first substrate and the step of forming the first common electrode on the second substrate may be implemented simultaneously.

In case that the handwriting display device adopts a configuration described in the above second example, each of the unit pixels further comprises a retaining unit, and the step of forming the plurality of unit pixels arranged in array further comprises:

providing a first substrate and a second substrate;

forming a second common electrode, a piezoelectric medium, a second sub-pixel electrode, a dielectric medium, a barrier and a display medium on the first substrate, wherein the piezoelectric medium is on the second common electrode; the second sub-pixel electrode is on the piezoelectric medium; the second sub-pixel electrode, the second common electrode and the piezoelectric medium together form the piezoelectric unit; the dielectric medium and the display medium are on the second sub-pixel electrode; and the barrier is at an edge of each of the unit pixels;

forming a third common electrode on the second substrate; and assembling the second substrate with the first substrate, so that the second common electrode, the third common electrode and the display medium together form the display unit; and the second common electrode, the third common electrode and the dielectric medium together form the retaining unit.

The step of forming the second common electrode, the piezoelectric medium, the second sub-pixel electrode, the dielectric medium, the barrier and the display medium on the first substrate and the step of forming the third common electrode on the second substrate may be changed in order. For example, the step of forming the second common electrode, the piezoelectric medium, the second sub-pixel electrode, the dielectric medium, the barrier and the display medium on the first substrate is implemented firstly, and then the step of forming the third common electrode on the second substrate is implemented. Or, the step of forming the third common electrode on the second substrate is implemented firstly, and then the step of forming the second common electrode, the piezoelectric medium, the second sub-pixel electrode, the dielectric medium, the barrier and the display medium on the first substrate is implemented. Or else, the step of forming the second common electrode, the piezoelectric medium, the second sub-pixel electrode, the dielectric medium, the barrier and the display medium on the first substrate and the step of forming the third common electrode on the second substrate may be implemented simultaneously.

In case that the handwriting display device adopts a configuration described in the above third example, each of the unit pixels further comprises a retaining unit, and the step of forming the plurality of unit pixels arranged in array further comprises:

providing a first substrate and a second substrate;

forming a fourth common electrode, a piezoelectric medium, a third sub-pixel electrode, a dielectric medium, a fourth sub-pixel electrode, a barrier and a display medium on the first substrate, wherein the piezoelectric medium is between the fourth common electrode and the third sub-pixel electrode; the fourth common electrode, the third sub-pixel electrode and the piezoelectric medium together form the piezoelectric unit; the dielectric medium is between the third sub-pixel electrode and the fourth sub-pixel electrode; the third sub-pixel electrode, the fourth sub-pixel electrode and the dielectric medium together form the retaining unit; the display medium is on the fourth sub-pixel electrode; and the barrier is at an edge of each of the unit pixels;

forming a fifth common electrode on the second substrate; and assembling the second substrate with the first substrate, so that the fourth sub-pixel electrode, the fifth common electrode and the display medium together form the display unit.

Specifically, in the step of forming the fourth common electrode, the piezoelectric medium, the third sub-pixel electrode, the dielectric medium, the fourth sub-pixel electrode, the barrier and the display medium on the first substrate, firstly, the fourth common electrode, for example, metal electrode, is formed on the first substrate, then, an insulation layer is formed to cover over the fourth common electrode in order to protect the fourth common electrode, after that, a piezoelectric material layer is coated on the insulation layer, a first metal layer (third sub-pixel electrode layer) is deposited, a high dielectric constant material is coated, and a second metal layer (fourth sub-pixel electrode layer) is deposited. Then, the piezoelectric medium, the third sub-pixel electrode, the dielectric medium and the fourth sub-pixel electrode are formed by using a dry etching process and/or a wet etching process. More specifically, in each of the unit pixels, quantity of the piezoelectric medium, quantity of the third sub-pixel electrode, quantity of the dielectric medium and quantity of the fourth sub-pixel electrode are the same and are multiple. A spacing between every two adjacent piezoelectric mediums, a spacing between every two adjacent third sub-pixel electrodes, a spacing between every two adjacent dielectric mediums and a spacing between every two adjacent fourth sub-pixel electrodes, each should be less than size of the display medium. For example, if the display medium is in a spherical shape, then the spacing between every two adjacent piezoelectric mediums, the spacing between every two adjacent third sub-pixel electrodes, the spacing between every two adjacent dielectric mediums and the spacing between every two adjacent fourth sub-pixel electrodes, each should be less than a diameter of the display medium. After that, a planarization layer is formed to cover over the fourth sub-pixel electrode in order to fill up gaps between every two adjacent fourth sub-pixel electrodes. Then, the barrier is formed. Finally, the display medium is filled.

Similarly, the step of forming the fourth common electrode, the piezoelectric medium, the third sub-pixel electrode, the dielectric medium, the fourth sub-pixel electrode, the barrier and the display medium on the first substrate and the step of forming the fifth common electrode on the second substrate may be changed in order. For example, the step of forming the fourth common electrode, the piezoelectric medium, the third sub-pixel electrode, the dielectric medium, the fourth sub-pixel electrode, the barrier and the display medium on the first substrate is implemented firstly, and then the step of forming the fifth common electrode on the second substrate is implemented. Or, the step of forming the fifth common electrode on the second substrate is implemented firstly, and then the step of forming the fourth common electrode, the piezoelectric medium, the third sub-pixel electrode, the dielectric medium, the fourth sub-pixel electrode, the barrier and the display medium on the first substrate is implemented. Or else, the step of forming the fourth common electrode, the piezoelectric medium, the third sub-pixel electrode, the dielectric medium, the fourth sub-pixel electrode, the barrier and the display medium on the first substrate and the step of forming the fifth common electrode on the second substrate may be implemented simultaneously.

According to embodiments of the present disclosure, there also provides a controlling method for the handwriting display device according to the above embodiments of the present disclosure. The controlling method comprises:

sensing a pressure by the piezoelectric unit in each of the unit pixels of the handwriting display device, and displaying a picture by the display unit in each of the unit pixels.

Same or like contents of one embodiment described in the description may refer to same or like contents of another embodiment described in the description, although each of them has its focus that is different from that of the other embodiments. Especially, the embodiments for the controlling method are generally same or similar to those for the device, and thus they are described shortly, however, same or like contents of the embodiments for the device may be referred to.

The step of sensing a pressure by the piezoelectric unit in each of the unit pixels of the handwriting display device, and displaying a picture by the display unit in each of the unit pixels, further comprises:

sensing a pressure by the piezoelectric medium of the piezoelectric unit, to generate an excitation voltage difference between the first plate electrode and the second plate electrode of the piezoelectric unit;

generating, under excitation of the excitation voltage difference, a display voltage difference between the third plate electrode and the fourth plate electrode of the display unit; and moving, under the action of the display voltage difference, the display medium of the display unit, so that the display unit displays a picture.

In case that the handwriting display device adopts a configuration described in the above first example, after the steps of generating, under excitation of the excitation voltage difference, the display voltage difference between the third plate electrode and the fourth plate electrode of the display unit; and of moving, under the action of the display voltage difference, the display medium of the display unit, so that the display unit displays the picture, the controlling method further comprises:

applying, by a refreshing circuit of the handwriting display device, a reverse voltage difference, that is opposite to the display voltage difference, between the first common electrode and the first sub-pixel electrode of the display unit in each of the unit pixels, to discharge the display unit;

and/or making, by a first short circuit of the handwriting display device, a direct short between the first common electrode and the first sub-pixel electrode of the display unit in each of the unit pixels.

In case that the handwriting display device adopts a configuration described in the above second example, after the steps of generating, under excitation of the excitation voltage difference, the display voltage difference between the third plate electrode and the fourth plate electrode of the display unit; and of moving, under the action of the display voltage difference, the display medium of the display unit, so that the display unit displays the picture, the controlling method further comprises:

detecting, by the signal detection circuit of the handwriting display device, the display voltage difference generated by the display unit when a pressure is sensed by the piezoelectric medium;

amplifying, by the signal amplifying circuit of the handwriting display device, the display voltage difference detected by the signal detection circuit;

storing, by the register circuit of the handwriting display device, the display voltage difference amplified by the signal amplifying circuit;

charging, by the charging circuit of the handwriting display device, the retaining unit in accordance with the display voltage difference amplified by the signal amplifying circuit;

detecting, by the signal detection circuit of the handwriting display device, a current voltage difference of the display unit after the pressure sensed by the piezoelectric medium is cancelled;

judging, by the judging circuit of the handwriting display device, whether or not the current voltage difference of the display unit is less than the display voltage difference amplified by the signal amplifying circuit; and charging, by the charging circuit of the handwriting display device, the retaining unit if it is judged by the judging circuit that the current voltage difference of the display unit is less than the display voltage difference amplified by the signal amplifying circuit.

In case that the handwriting display device adopts the configuration described in the above second example, after the steps of generating, under excitation of the excitation voltage difference, the display voltage difference between the third plate electrode and the fourth plate electrode of the display unit; and of moving, under the action of the display voltage difference, the display medium of the display unit, so that the display unit displays the picture, the controlling method further comprises:

making, by the second short circuit of the handwriting display device, a direct short between the second common electrode and the second sub-pixel electrode.

In case that the handwriting display device adopts the configuration described in the above third example, after the steps of generating, under excitation of the excitation voltage difference, the display voltage difference between the third plate electrode and the fourth plate electrode of the display unit; and of moving, under the action of the display voltage difference, the display medium of the display unit, so that the display unit displays the picture, the controlling method further comprises:

making, by the third short circuit of the handwriting display device, direct shorts between the third sub-pixel electrode and the fourth common electrode and between the fourth sub-pixel electrode and the fourth common electrode.

In the above description of the embodiments, these specific features, structures, materials or characteristics can be combined in suitable manner in one or more of these embodiments or examples.

The above description is merely used to illustrate specific embodiments of the present disclosure, but not to limit the present disclosure. Although a detailed description of embodiments of the present disclosure with reference to the attached drawings is provided, it should be understood by those skilled in the art that, all of changes, alternatives, modifications, made within principles and spirit of the present disclosure, should be included within the scope of the present disclosure. Accordingly, the scope of the present disclosure is defined in the claims and their equivalents.

What is claimed is:

1. A handwriting display device, comprising a plurality of unit pixels arranged in array, wherein, each of the unit pixels comprises a piezoelectric unit and a display unit, the piezoelectric unit is configured for sensing a pressure to excite the display unit, and the display unit is configured for displaying a picture under excitation implemented by the piezoelectric unit;

the piezoelectric unit comprises a first plate electrode, a second plate electrode parallel with and opposite to the first plate electrode, and a piezoelectric medium between the first plate electrode and the second plate electrode;

the display unit comprises a third plate electrode, a fourth plate electrode parallel with and opposite to the third plate electrode, and a display medium between the third plate electrode and the fourth plate electrode; and whereby, in the piezoelectric unit, an excitation voltage difference is generated between the first plate electrode and the second plate electrode when a pressure is sensed by the piezoelectric medium; and in the display unit, a display voltage difference is generated between the third plate electrode and the fourth plate electrode under excitation of the excitation voltage difference, and the display medium moves under the action of the display voltage difference, and thereby the display unit displays the picture.

2. The handwriting display device of claim 1, comprising a first substrate and a second substrate parallel with and opposite to each other, wherein, the unit pixels are between the first substrate and the second substrate and each of the unit pixels comprises a first common electrode and a first sub-pixel electrode which are parallel with the first substrate, the first common electrode is on the second substrate, the first sub-pixel electrode is on the first substrate, and the first sub-pixel electrode is opposite to the first common electrode;

wherein, both the first plate electrode of the piezoelectric unit and the third plate electrode of the display unit are formed of the first sub-pixel electrode, while both the second plate electrode of the piezoelectric unit and the fourth plate electrode of the display unit are formed of the first common electrode.

3. The handwriting display device of claim 2, wherein, the handwriting display device further comprises: a refreshing circuit connected to the first common electrode and the first sub-pixel electrode, respectively, and configured to apply a reverse voltage difference, that is opposite to the display voltage difference, between the first common electrode and the first sub-pixel electrode, to discharge the display unit; and/or, wherein, the handwriting display device further comprises: a first short circuit connected to the first common electrode and the first sub-pixel electrode, respectively, and configured to make a direct short between the first common electrode and the first sub-pixel electrode.

4. The handwriting display device of claim 1, comprising a first substrate and a second substrate parallel with and opposite to each other, wherein, the unit pixels are between the first substrate and the second substrate and each of the unit pixels comprises a second common electrode, a third common electrode and a second sub-pixel electrode all parallel with the first substrate, the second common electrode is on the first substrate, the third common electrode is on the second substrate, the second common electrode is opposite to the third common electrode, and the second sub-pixel electrode is between the second common electrode and the third common electrode;

wherein, the first plate electrode of the piezoelectric unit is formed of the second common electrode, the fourth plate electrode of the display unit is formed of the third common electrode, and both the second plate electrode of the piezoelectric unit and the third plate electrode of the display unit are formed of the second sub-pixel electrode.

5. The handwriting display device of claim 4, wherein, each of the unit pixels further comprises a retaining unit configured to keep a current voltage difference of the display unit after the pressure sensed by the piezoelectric medium is cancelled, and the retaining unit comprises a fifth plate electrode, a sixth plate electrode opposite to the fifth plate electrode, and a dielectric medium between the fifth plate electrode and the sixth plate electrode, wherein, the fifth plate electrode of the retaining unit is formed of the second sub-pixel electrode, and the sixth plate electrode of the retaining unit is formed of the third common electrode.

6. The handwriting display device of claim 5, further comprising a signal detection circuit, a signal amplifying circuit and a charging circuit connected in sequence, wherein, the signal detection circuit is also connected to the display unit, and the charging circuit is also connected to the retaining unit; wherein, the signal detection circuit is configured for detecting the display voltage difference generated by the display unit when the pressure is sensed by the piezoelectric medium;

the signal amplifying circuit is configured for amplifying the display voltage difference detected by the signal detection circuit; and the charging circuit is configured for charging the retaining unit in accordance with the display voltage difference amplified by the signal amplifying circuit.

7. The handwriting display device of claim 6, further comprising: a register circuit and a judging circuit, wherein, the register circuit is connected to the signal amplifying circuit, and is configured for storing the display voltage difference amplified by the signal amplifying circuit;

the signal detection circuit is also configured for detecting the current voltage difference of the display unit after the pressure sensed by the piezoelectric medium is cancelled;

the judging circuit is connected to the signal detection circuit, the register circuit and the charging circuit, respectively, and is configured for judging whether or not the current voltage difference of the display unit is less than the display voltage difference amplified by the signal amplifying circuit; and the charging circuit is also configured for charging the retaining unit if it is judged by the judging circuit that the current voltage difference of the display unit is less than the display voltage difference amplified by the signal amplifying circuit.

8. The handwriting display device of claim 4, wherein, electric potential of the second common electrode is the same as electric potential of the third common electrode.

9. The handwriting display device of claim 8, further comprising a second short circuit connected to the second common electrode and the second sub-pixel electrode, respectively, and configured to make a direct short between the second common electrode and the second sub-pixel electrode.

10. The handwriting display device of claim 1, comprising a first substrate and a second substrate parallel with and opposite to each other, wherein, the unit pixels are between the first substrate and the second substrate and each of the unit pixels comprises a fourth common electrode, a fifth common electrode, a third sub-pixel electrode and a fourth sub-pixel electrode all parallel with the first substrate, the fourth common electrode is on the first substrate, the fifth common electrode is on the second substrate, the fourth common electrode is opposite to the fifth common electrode, the third sub-pixel electrode is between the fourth common electrode and the fifth common electrode, and the fourth sub-pixel electrode is between the third common electrode and the fifth common electrode;

wherein, the first plate electrode of the piezoelectric unit is formed of the fourth common electrode, the second plate electrode of the piezoelectric unit is formed of the third sub-pixel electrode, the third plate electrode of the display unit is formed of the fourth sub-pixel electrode, and the fourth plate electrode of the display unit is formed of the fifth common electrode.

11. The handwriting display device of claim 10, wherein, each of the unit pixels further comprises a retaining unit configured to keep a current voltage difference of the display unit after the pressure sensed by the piezoelectric medium is cancelled, and the retaining unit comprises a fifth plate electrode, a sixth plate electrode opposite to the fifth plate electrode, and a dielectric medium between the fifth plate electrode and the sixth plate electrode, wherein the fifth plate electrode of the retaining unit is formed of the third sub-pixel electrode, and the sixth plate electrode of the retaining unit is formed of the fourth sub-pixel electrode.

12. The handwriting display device of claim 10, wherein, electric potential of the fourth common electrode is the same as electric potential of the fifth common electrode.

13. The handwriting display device of claim 12, further comprising a third short circuit connected to the fourth common electrode, the third sub-pixel electrode and the fourth sub-pixel electrode, respectively, and configured to make direct shorts between the third sub-pixel electrode and the fourth common electrode and between the fourth sub-pixel electrode and the fourth common electrode, simultaneously.

14. The handwriting display device of claim 1, wherein, both the third plate electrode and the fourth plate electrode of the display unit are parallel with the first substrate; or, the third plate electrode and the fourth plate electrode of the display unit are not parallel with the first substrate while the third plate electrode and the fourth plate electrode are parallel with each other.

15. The handwriting display device of claim 1, wherein, the display medium comprises an electrophoretic monomer display medium or a bistable state display medium.

16. A manufacturing method for the handwriting display device of claim 1, the manufacturing method comprising:
    forming a plurality of unit pixels arranged in array, each of the unit pixels comprising: the piezoelectric unit configured for sensing a pressure to excite the display unit and the display unit configured for displaying a picture under excitation implemented by the piezoelectric unit.

17. The manufacturing method of claim 16, wherein, the step of forming the plurality of unit pixels arranged in array comprises:
    providing a first substrate and a second substrate;
    forming a first sub-pixel electrode, a piezoelectric medium, a barrier and a display medium on the first substrate, wherein the piezoelectric medium and the display medium are on the first sub-pixel electrode while the barrier is at an edge of each of the unit pixels;
    forming a first common electrode on the second substrate; and
    assembling the second substrate with the first substrate, so that the first sub-pixel electrode, the first common electrode and the piezoelectric medium together form the piezoelectric unit; while the first sub-pixel electrode, the first common electrode and the display medium together form the display unit.

18. The manufacturing method of claim 16, wherein, each of the unit pixels further comprises a retaining unit, and the step of forming the plurality of unit pixels arranged in array comprises:
    providing a first substrate and a second substrate;
    forming a second common electrode, a piezoelectric medium, a second sub-pixel electrode, a dielectric medium, a barrier and a display medium on the first substrate, wherein the piezoelectric medium is on the second common electrode; the second sub-pixel electrode is on the piezoelectric medium; the second sub-pixel electrode, the second common electrode and the piezoelectric medium together form the piezoelectric unit; the dielectric medium and the display medium are on the second sub-pixel electrode; and the barrier is at an edge of each of the unit pixels;
    forming a third common electrode on the second substrate; and
    assembling the second substrate with the first substrate, so that the second common electrode, the third common electrode and the display medium together form the display unit; and the second common electrode, the third common electrode and the dielectric medium together form the retaining unit.

19. The manufacturing method of claim 16, wherein, each of the unit pixels further comprises a retaining unit, and the step of forming the plurality of unit pixels arranged in array comprises:
    providing a first substrate and a second substrate;
    forming a fourth common electrode, a piezoelectric medium, a third sub-pixel electrode, a dielectric medium, a fourth sub-pixel electrode, a barrier and a display medium on the first substrate, wherein the piezoelectric medium is between the fourth common electrode and the third sub-pixel electrode; the fourth common electrode, the third sub-pixel electrode and the piezoelectric medium together form the piezoelectric unit; the dielectric medium is between the third sub-pixel electrode and the fourth sub-pixel electrode; the third sub-pixel electrode, the fourth sub-pixel electrode and the dielectric medium together form the retaining unit; the display medium is on the fourth sub-pixel electrode; and the barrier is at an edge of each of the unit pixels;
    forming a fifth common electrode on the second substrate; and
    assembling the second substrate with the first substrate, so that the fourth sub-pixel electrode, the fifth common electrode and the display medium together form the display unit.

20. A controlling method for the handwriting display device of claim 1, the controlling method comprising:
    sensing a pressure by the piezoelectric unit in each of the unit pixels of the handwriting display device, and displaying a picture by the display unit in each of the unit pixels.

* * * * *